US011593872B2

(12) United States Patent
Koon et al.

(10) Patent No.: US 11,593,872 B2
(45) Date of Patent: *Feb. 28, 2023

(54) IMMERSIVE VIRTUAL ENTERTAINMENT SYSTEM

(71) Applicant: AT&T Intellectual Property I, L.P., Atlanta, GA (US)

(72) Inventors: Robert J. Koon, Saint Louis, MO (US); Christopher Carl, Atlanta, GA (US); Miranda Bradley, Austin, TX (US); Katie Alvarez, Ballwin, MO (US); Brittany Landry, Atlanta, GA (US); Eric Ricchezza, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,897

(22) Filed: Jul. 13, 2021

(65) Prior Publication Data

US 2021/0342932 A1    Nov. 4, 2021

Related U.S. Application Data

(63) Continuation of application No. 15/629,441, filed on Jun. 21, 2017, now Pat. No. 11,094,001.

(51) Int. Cl.
*G06Q 30/00* (2012.01)
*G06Q 30/0601* (2023.01)
(Continued)

(52) U.S. Cl.
CPC ..... *G06Q 30/0643* (2013.01); *G06Q 30/0251* (2013.01); *G06Q 50/01* (2013.01); *G06T 13/40* (2013.01); *G06T 19/003* (2013.01)

(58) Field of Classification Search
None
See application file for complete search history.

(56) References Cited

U.S. PATENT DOCUMENTS 5,714,997 A    2/1998  Anderson et al.
8,185,587 B2   5/2012  Dudley et al.
(Continued)

FOREIGN PATENT DOCUMENTS

CN    101872241 B    7/2014
KR    101527993 B1   6/2015
WO    2016029224 A1  2/2016

OTHER PUBLICATIONS

IP.com, Virtualizing Real Events, Dec. 9, 2008, https://ip.com/IPCOM/000177358, 2 pps (Year: 2008).*
(Continued)

*Primary Examiner* — Michael W Schmucker
(74) *Attorney, Agent, or Firm* — Guntin & Gust, PLC; John G. Rauch

(57) ABSTRACT

Aspects of the subject disclosure may include, for example, a method that includes generating a virtual venue for the virtual reality space, wherein the generating the virtual venue including replicating an architecture of a venue associated with the event and generating a plurality of virtual stores for the virtual venue, wherein each virtual store is associated with each participant of the plurality of participants, accessing a plurality of cameras and a plurality of microphones associated with the event, generating the virtual reality space based on the plurality of participants, the virtual venue, the plurality of microphones, and the plurality of cameras, generating a plurality of images for each participant of the plurality of participants according to each profile for each participant of the plurality of participants to participate in the event, and presenting the virtual reality (Continued)

space to user equipment in a virtual reality format. Other embodiments are disclosed.

20 Claims, 8 Drawing Sheets

(51) Int. Cl.
*G06T 13/40* (2011.01)
*G06T 19/00* (2011.01)
*G06Q 50/00* (2012.01)
*G06Q 30/0251* (2023.01)

(56) References Cited

U.S. PATENT DOCUMENTS

| | | | |
|---|---|---|---|
| 8,966,380 | B2 | 2/2015 | Sobol et al. |
| 9,581,962 | B1 | 2/2017 | Duffy et al. |
| 2005/0015286 | A1* | 1/2005 | Rudnik ............... H04N 5/9201 386/E5.002 |
| 2005/0148388 | A1 | 7/2005 | Vayra et al. |
| 2006/0281552 | A1 | 12/2006 | Bulusu et al. |
| 2008/0082311 | A1 | 4/2008 | Meijer et al. |
| 2008/0102947 | A1* | 5/2008 | Hays ..................... A63F 13/79 463/31 |
| 2009/0019366 | A1 | 1/2009 | Abhyanker et al. |
| 2009/0238378 | A1 | 9/2009 | Kikinis et al. |
| 2009/0262194 | A1* | 10/2009 | Wakefield ........ H04N 21/21805 348/157 |
| 2010/0131947 | A1 | 5/2010 | Ackley et al. |
| 2011/0040645 | A1 | 2/2011 | Rabenold et al. |
| 2011/0072367 | A1 | 3/2011 | Bauer et al. |
| 2011/0134209 | A1 | 6/2011 | Schmidt et al. |
| 2012/0142415 | A1 | 6/2012 | Lindsay et al. |
| 2012/0264511 | A1* | 10/2012 | Marsland ................ A63F 13/61 463/31 |
| 2012/0269494 | A1 | 10/2012 | Satyanarayana et al. |
| 2014/0004487 | A1 | 1/2014 | Cheben et al. |
| 2014/0162598 | A1* | 6/2014 | Villa-Real ............... H04M 1/66 455/411 |
| 2015/0286275 | A1 | 10/2015 | Huang |
| 2016/0027209 | A1 | 1/2016 | Demirli |
| 2016/0030841 | A1 | 2/2016 | Perlman et al. |
| 2016/0035016 | A1 | 2/2016 | Spio |
| 2016/0133230 | A1 | 5/2016 | Daniels et al. |
| 2016/0196596 | A1* | 7/2016 | Van Wie ............. H04L 12/1813 705/26.41 |
| 2016/0253844 | A1 | 9/2016 | Petrovskaya et al. |
| 2016/0259497 | A1* | 9/2016 | Foss .................... G06F 3/04817 |
| 2017/0365102 | A1* | 12/2017 | Huston .................. G06T 17/00 |
| 2018/0124497 | A1 | 5/2018 | Boesen |
| 2018/0342106 | A1 | 11/2018 | Rosado |
| 2018/0374145 | A1 | 12/2018 | Koon et al. |

OTHER PUBLICATIONS

"A Place for Virtual Reality in Corporate and Live Event Production? You Bet", I37.com, accessed, Apr. 3, 2017.
"The Event Marketer's Guide to Virtual Reality", www.eventmarketer.com, May 6, 2015.
Coleman, Mary-Hanley, "Virtual reality is here", www,centerline.net, https://www.centerline.net/blog/virtualrealityishere/, Aug. 8, 2016.
Levin, Josh, "Virtual and Augmented Reality: What Event Organizers Must Know", www.bizzabo.com, http://blog.bizzabo.com/virtualandaugmentedrealityforeventorganizers, Jul. 20, 2016.
Tucker, Erinn, "Using Virtual Reality at Events 101: Your Guide to this Exciting Technology", www.socialtables.com, Feb. 6, 2017.
Zakrzewski, Cat, "Virtual Reality Takes on the Videoconference", www.wsj.com, Sep. 18, 2016.

* cited by examiner

100

200

300

400

500

600

IMMERSIVE VIRTUAL ENTERTAINMENT SYSTEM

CROSS REFERENCE TO RELATED APPLICATIONS

This application is a continuation of U.S. patent application Ser. No. 15/629,441 filed on Jun. 21, 2017. All sections of the aforementioned application are incorporated herein by reference in their entirety.

FIELD OF THE DISCLOSURE

The subject disclosure relates to a virtual reality system that provides an immersive, virtual reality based social experience between users

BACKGROUND

Virtual reality allows users to view environments as though they were real. Virtual reality goggles can provide users with a 360-degree view of media content.

BRIEF DESCRIPTION OF THE DRAWINGS

Reference will now be made to the accompanying drawings, which are not necessarily drawn to scale, and wherein.

DETAILED DESCRIPTION

Figure 1:
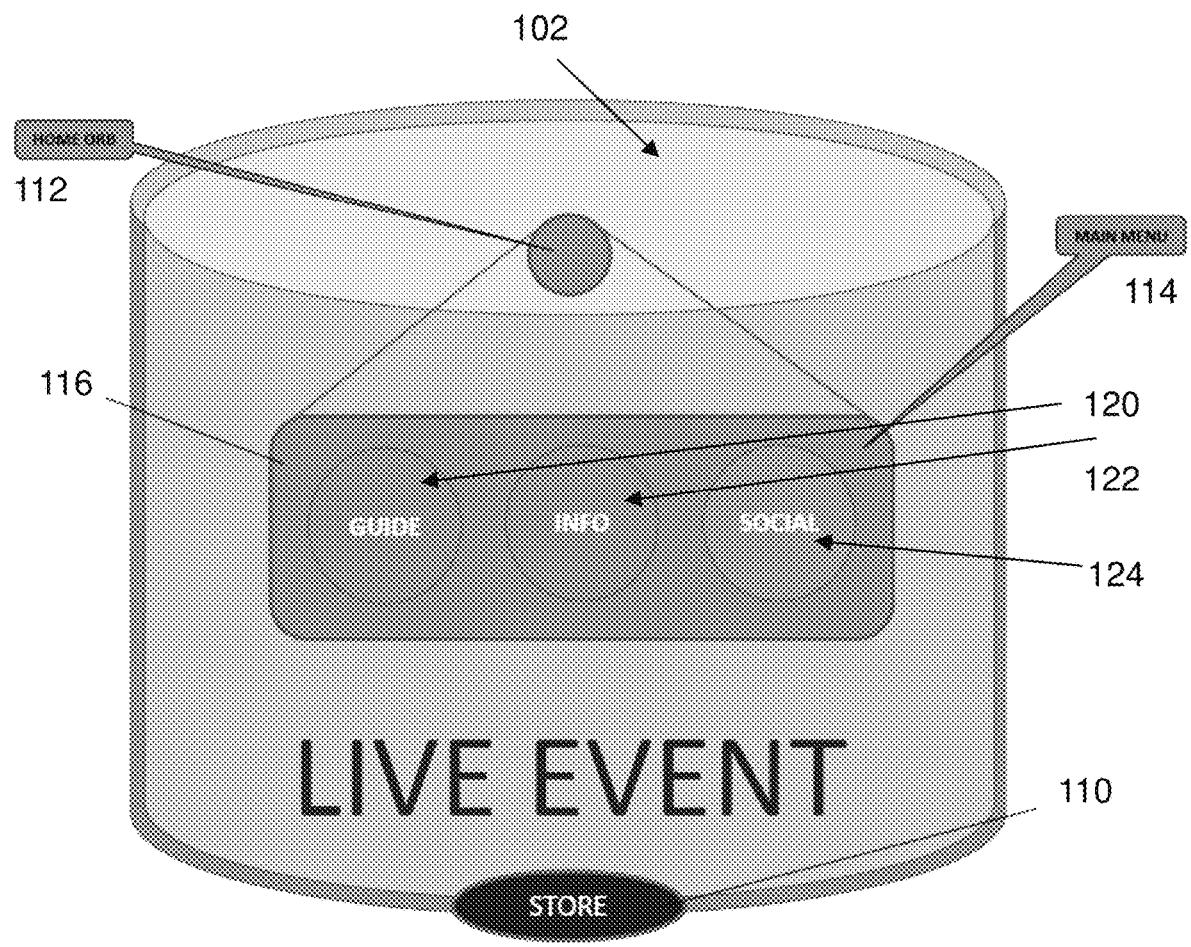
FIG. 1 depicts an illustrative embodiment of System 100.

The subject disclosure describes, among other things, illustrative embodiments for a virtual reality system that provides a social experience between users. Exemplarily, virtual reality systems entail a user viewing a screen that provides a view to a virtual reality environment. Exemplarily, an explorable, three-dimensional environment is provided to groups of users so that they can engage in social activities while viewing or participating in or attending various events. Exemplarily, the screen is employed in goggles that can track the movement of the user to change the view provided by the goggles' screens. Exemplarily, while engaged in the virtual reality environment, menus and other interactive features can be engaged. Other embodiments are described in the subject disclosure.

One or more aspects of the subject disclosure include a method that includes accessing, by a processing system comprising a processor, a profile for each participant of a plurality of participants for a virtual reality space to participate in an event, generating, by the processing system, a virtual venue for the virtual reality space, wherein the generating the virtual venue including replicating an architecture of a venue associated with the event and generating a plurality of virtual stores for the virtual venue, wherein each virtual store of the plurality of virtual stores is associated with each participant of the plurality of participants according to each profile for each participant of the plurality of participants, accessing, by the processing system, a plurality of cameras and a plurality of microphones associated with the event, generating, by the processing system, the virtual reality space for the event based on the plurality of participants, the virtual venue, the plurality of microphones, and the plurality of cameras, generating a plurality of images for each participant of the plurality of participants according to each profile for each participant of the plurality of participants to participate in the event, and presenting the virtual reality space to user equipment in a virtual reality format.

One or more aspects of the subject disclosure include a device that includes a processing system including a processor and a memory that stores executable instructions that, when executed by the processing system, facilitate performance of operations, including generating a virtual reality space for an event, wherein details for the event are received from a virtual reality server, wherein the details include receiving event information from a plurality of cameras and a plurality of microphones associated with the event and social information for the event including a plurality of participants of the event, generating a virtual venue for the virtual reality space, generating an architecture of a venue associated with the event, generating the virtual reality space for the event based on the plurality of participants, the virtual venue, the plurality of microphones, and the plurality of cameras, generating a plurality of images for each participant of the plurality of participants according to each profile for each participant of the plurality of participants to participate in the event, and presenting the virtual reality space in a virtual reality format.

One or more aspects of the subject disclosure include machine-readable storage medium, including executable instructions that, when executed by a processing system including a processor, facilitate performance of operations, including accessing a plurality of cameras and a plurality of microphones associated with an event to be presented in a virtual reality space, generating a virtual venue for the virtual reality space based on a layout for the event, generating a virtual reality space for the event based on the virtual venue and a video input from the plurality of microphones and an audio input from the plurality of cameras, receiving participation information for the event including profiles for each participant of a plurality of participants, generating a plurality of images for each participant of the plurality of participants according to each profile for each participant of the plurality of participants to participate in the event in the virtual reality space, wherein equipment of each participant presents the virtual reality space to user in a virtual reality format, receiving activity information for each participant including a participant field of view and participant social information, and manipulating the plurality of images in the virtual reality space according to the activity information.

FIG. 1 depicts an illustrative embodiment of a virtual reality system 100. Referring to FIG. 1, a user can be presented with a virtual reality environment 102 that exemplarily includes a first menu 112 which may be referred to as a "home orb" and a second menu 114 which may be referred to as the "main menu". Exemplarily, the user's point of view in the virtual environment can contain icons or other cues to access these menus. Exemplarily, accessing these menus can include verbal commands, looking directly at the menu icons, or other actions. In some embodiments, the movement of limbs of the person wearing or using virtual reality goggles can be observed by an image sensor to track the limb to determine which virtual menu option is being selected.

Exemplarily, the home orb 112 is presented in the virtual reality environment as a hovering orb or other object. Exemplarily, when the home orb 112 is viewed directly by a viewer, such as by the viewer exemplarily lifting his head to view the home orb 112, a menu can be displayed for the viewer to interact with. In some embodiments, the menu can be a main menu 114 as illustrated in FIG. 1 which can provide access to sub-menus. For example, one sub-menu can be a guide button 120, another sub-menu can be an information button 122, and a third exemplary sub-menu can be a social button 124.

Exemplarily, the guide button 120 can provide the interactive ability to guide the viewer through content available to the viewer. This content can include menus and other information available to the user. Exemplarily, the information button 122 can include information about the virtual reality environment 102 and other relevant features or facets of the virtual reality environment 102. Information about the virtual reality environment 102 can include maps of the virtual venue along with locations of items of interest within virtual reality environment 102 as well as the location of other users or members of a group to which the user belongs. Exemplarily, the virtual venue can be populated with items of interest, games, stores, and other virtual items related to the event.

Exemplarily, the virtual reality environment 102 can represent a venue having specific dimensions and construction. Exemplarily, the virtual reality environment 102 can be traversed by viewers to thereby view and enter different portions of the venue. Exemplarily, the venues in the virtual reality environment 102 can represent theaters, sports arenas, outdoor areas, concert venues, homes, offices, vehicles, and other possible environments in which a person or group of persons would wish to view a virtual environment.

Exemplarily, the virtual reality environment 102 can include a store front 110 related to the venue. Exemplarily, the merchandise sold within the store front 110 can be tailored to a profile for each viewer in the virtual reality environment 102. The store front 110 can be fashioned after an event taking place in the virtual reality environment 102, such as if the viewers were in a venue in which a concert by a band was taking place. In this example, then T-shirts and other items related to the band can be made available for sale to the viewers if they choose to enter the store front 110. In other embodiments, the store can provide virtual goods, such as clothing for the user's avatar to wear within the virtual reality environment 102.

Figure 2:
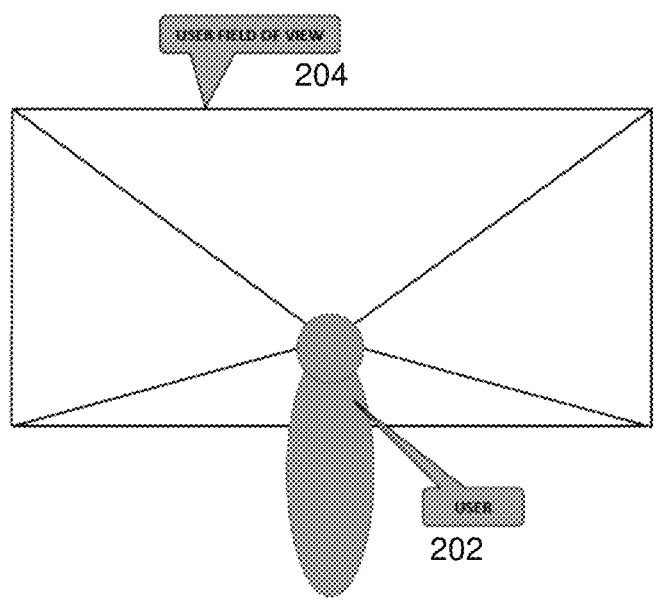
FIG. 2 depicts an illustrative embodiment of System 200.

FIG. 2 depicts an illustrative embodiment of system 200 in which a user 202 is, through virtual reality equipment such as virtual reality goggles, enmeshed in a virtual reality environment, such as the virtual reality environment 102 of FIG. 1. In FIG. 2, the user 202 is presented with a field of view 204 which can be a portion of the virtual reality environment 102 of FIG. 1. Exemplarily, the user's field of view 204 changes as the user 202 changes the position of his head. In some embodiments, the user's field of view 204 can change when the user's eyes move even without head motion.

The user's field of view can be optimized to provide a viewing environment that includes the additional menu items, stores, and advertisements without the presence of these features being placed in a disruptive area or line of sight. Exemplarily, the various menus and advertisements can be kept on the viewer's periphery in the virtual space. Exemplarily, the virtual venue in the virtual space can provide access to the event. Exemplary access to the event can include such options as a front row view to a concert, a sideline view to a sporting event, a curbside view to a parade, or a dais view of a political event. Exemplarily, the user and other users can be represented within the virtual space as icons or avatars. In some embodiments, the avatars can be images as life-like and photorealistic as possible.

Figure 3:
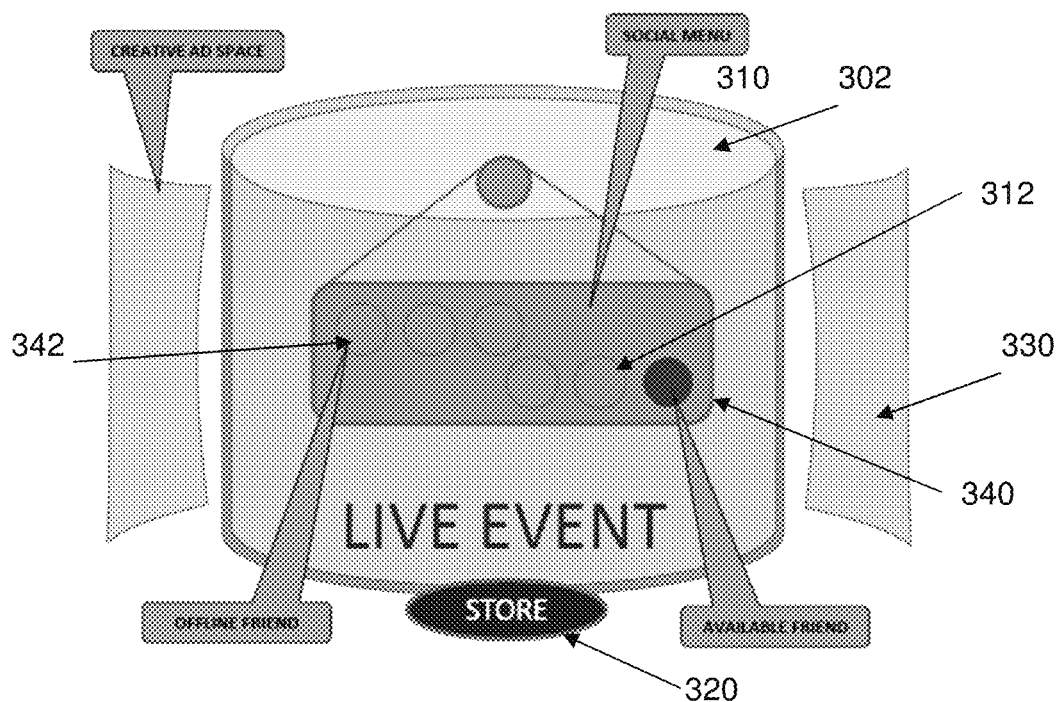
FIG. 3 depicts an illustrative embodiment of System 300.

FIG. 3 depicts an illustrative embodiment of a system 300 in which another exemplarily virtual reality environment 302 is provided. In this instance, the virtual reality environment 302 can be a virtual concert venue 302. In FIG. 3, an exemplary social menu 310 has been accessed while viewing the event. As discussed above, the virtual concert venue 302 can include a store front 320 related to the event. In addition, the virtual concert venue 302 can include dynamic ad presentations 330 related to the venue, event, and profile of each viewer viewing the event in the virtual concert venue 302.

Exemplarily, the viewer can view the event presented in the virtual concert venue 302 with friends or other social contacts. In addition, strangers can exemplarily enter the virtual concert venue 302 depending on the permissions that define the venue. Exemplarily, each viewer can be provided with their own view of the event and the virtual venue so they can explore the venue individually in virtual reality. Exemplarily, some items in the virtual venue are the same for all viewers while other items, such as the store and the advertising, can be unique to the viewer based, in some examples, on the viewer's profile or actions.

In the social menu 310, a social network system can exemplarily be provided to the user's view. In the social menu, social contacts can be represented by icons or avatars. While in a virtual environment, each participant in the environment can interact, as an avatar, with other avatars or icons representing other users. For example, some participants may be out of sight of an individual viewer's point of view yet the participant can be accessed by selecting an icon representing that participant. Exemplarily, multiple viewers can engage in a virtual environment to view or participate in the event taking place.

Within the virtual environment, the various participants can interact with each other. Interactions between the participants can include speech communication between participants, text exchanges, virtual engagements, virtual gifts, and viewpoint sharing. For example, in a virtual exchange a first exemplary viewer can give a second exemplary user, as represented by an avatar, a virtual high five. To a third party viewer, the exchange would look as though one avatar gave the other avatar a high-five. In another example, one user, through an avatar, could give a virtual gift to another avatar. Other viewers can observe the exchange take place. In other embodiments, these interactions can be private to only be observed by selected observers.

Exemplarily, the live event can be provided with various cameras and microphones to record the event. These microphones and cameras can be manipulated to generate a virtual event in the virtual environment which can be presented to each viewer through their respective virtual reality equipment. That is, the cameras and microphones can record the event and provide that information to the system to present the virtual event within the virtual environment. The virtual environment will also include the virtual venue. The viewers can the use their icons or avatars to interact with the virtual venue in the virtual environment and to view the virtual event as it takes place.

In some embodiments, the microphones can have noise cancelling qualities so as to isolate particular audio elements of the event. In some examples, the noise isolating microphones can produce audio only of the event taking place itself and exclude crowd noise. Exemplarily, viewers can be presented with an audio feed that cleanly presents the audio of the event and not crowd or other background noises. For example, in a virtual environment that is presented for a musical concert, the viewers may wish to hear only the feed or audio from the musicians and to not hear the crowd noise. In other embodiments, a virtual environment of a parade or sporting event can similarly exclude noise that is not part of the event, such as crowd noise or overflying planes or other forms of noise pollution.

Exemplarily, viewers participating in the event using the virtual environment can engage in social activities with other viewers. As illustrated in FIG. 3, an exemplary social group, or group of participants from the many participants in viewing the event can be formed as illustrated as group 340. Exemplarily, group 340 can be shown in a menu in a user's field of vision when requested. Exemplarily, the group can include various members 312 and 342. As illustrated in FIG. 3, some group members can be online and actively participating in the virtual environment while others are offline from the virtual environment. Regardless of each group member's presence in the virtual environment, other group members can contact those members through various social media tools.

Exemplarily, the members of the group can view the virtual event in the virtual environment. The group can interact with each other and exemplarily exclude other users, such as their icons and avatars, from appearing within the group. In some embodiments, the group can use the isolated audio from the source of the event to create a private, group only viewing of the virtual event in the virtual environment. In the private, group only viewing, crowd noise can be eliminated and only group audio can be presented to each member of the group. In some embodiments, the virtual event can be presented in private virtual environment for the group members. In other embodiments, the group members can invite or exclude group members fluidly throughout the event.

Exemplarily, the viewer can be presented with a virtual store 320 as part of the virtual reality environment 302. The virtual store 320 can be a location within the virtual environment or accessed through the user's point of view by accessing a menu or looking directly at a store icon. Exemplarily, the store can provide the user with various items related to the event and possibly modified according to the user's profile. Items purchased at the store can be real world items or items to engage with or wear by the user's avatar or icon. For example, the user's icon can wear a t-shirt appropriate to the event. Of course, the virtual store 320 can also provide items, goods, and services unrelated to the event.

Exemplarily, the virtual reality environment 302 can include dynamic ad presentations 330. Exemplarily, these dynamic ad presentations 330 can be presented in areas or points of view of the virtual environment so as to be unobtrusive. The viewer can see the dynamic ad presentations 330 off to one side and may engage the dynamic ad presentations 330 by staring directly at it, for example. In other examples, the dynamic ad presentations 330 can be accessed via the menu options available to the viewer.

Exemplarily, an event can be preprogrammed or supplied with advertising data. Exemplarily, the advertising data can take into account user profiles so as to present modified ads that are appropriate to the viewer. In some embodiments, by accessing the dynamic ad presentations 330, the user can be taken to the virtual store 320.

Figure 4:
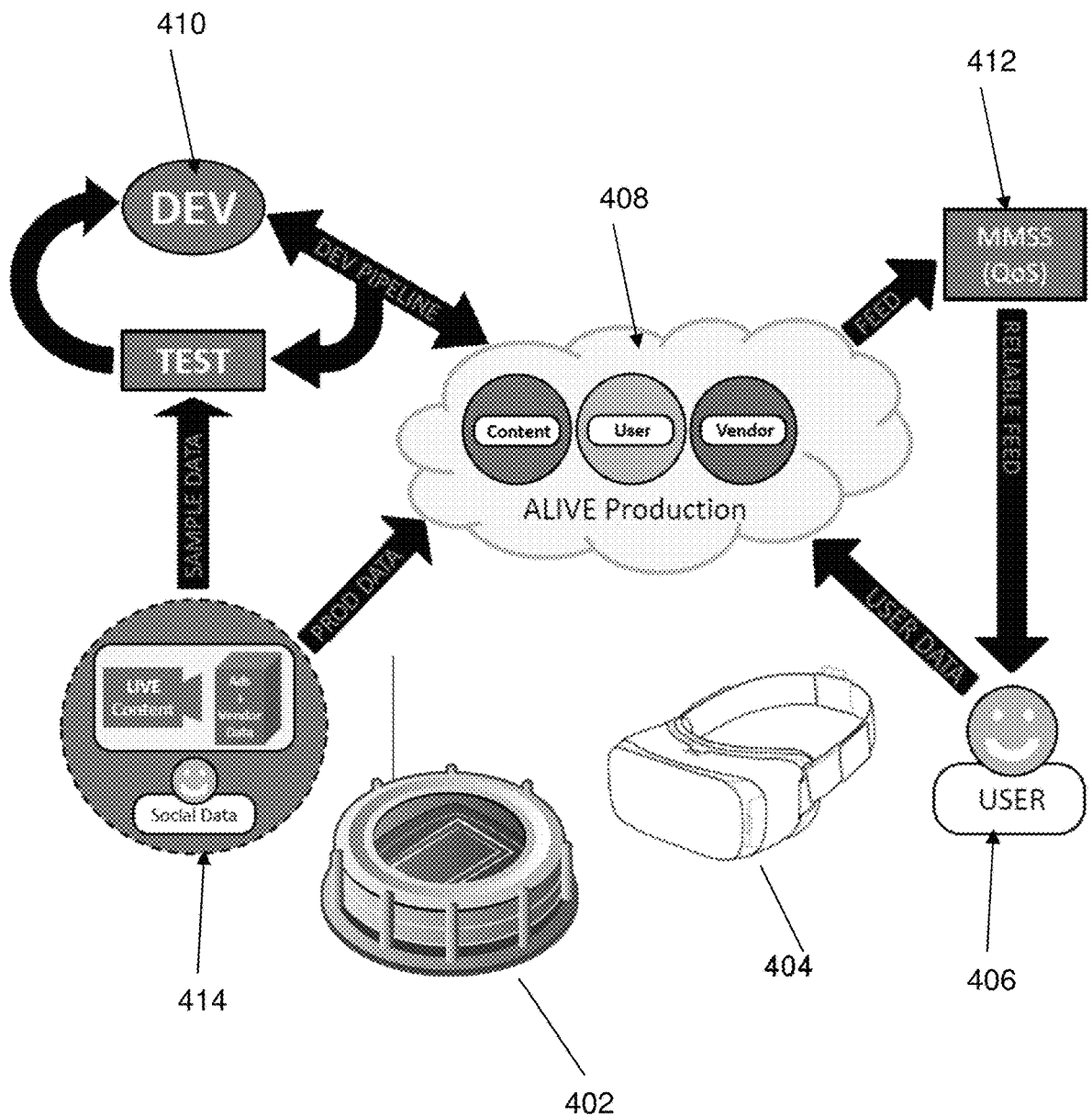
FIG. 4 depicts an illustrative embodiment of System 400.

FIG. 4 describes an exemplary system 400. Exemplarily, system 400 provides a virtual sporting venue 402 accessible through exemplary virtual reality goggle system 404. The venue can be provided to the user through an exemplary process in which a user profile 406 is accessed to determine user preferences. User data from the user profile 406 can be provided to a virtual reality immersive product generator 408. The virtual reality immersive product generator 408 can combine content from venue creator 414, advertiser and vendor information, and the user information to form the virtual reality experience illustrated as virtual sporting venue 402.

Exemplarily, the virtual reality immersive product generator 408 can access a multimedia sub-system (MMSS) 412 to bring quality to the content provided which to ensure and provide a Quality of Service (QoS) for video packets for low latency viewing, a requirement for virtual reality. Exemplarily, the virtual reality immersive product generator 408 can access a test and development center 410 to further refine the virtual reality experience.

Exemplarily, the venue creator 414 combines social data from a social network to generate the social interaction between viewers discussed above. In addition, the venue creator 414 receives content information. Exemplarily, the content information can be a live feed from the event or a previous recording of the event.

Exemplarily, the virtual reality experience can combine the content information from the event along with a social network component to allow users to interact with each other while viewing the content information. In addition, the virtual reality experience includes generating venue information. The venue information can include virtual seats for the venue at which the event is taking place as well as the views that can be provided to the user. The views can include points of view, or seats, from which the user can view the event. For example, different tiers of customers can view a concert event from different price points of seats, from front row seats to nose bleed seats.

The creation of the venue and the assigning of seats exemplarily includes generating a presentation of a virtual reality environment that reflects the venue in question and the perspective from which the user may view the event in question. In some embodiments, the seats can simply be the perspective of a camera at a sporting event which may be at a sideline view or a view from a press box or other camera placement at, for example, the stadium the event takes place. In other embodiments, the view can be generated from seats within the stands. Similarly, for musical events such as concerts, the seats can be generated from a camera located up close to the band or from further away by cameras that would be in seats.

The creation of the venue would include, additionally, the placement of advertising and other menu options in peripheral portions of the viewer's line of sight so as to not distract from the event being viewed or from the social interaction with the icons or avatars also attending the event.

The creation of a virtual venue for an event exemplarily includes generating a virtual reality model of the venue. The virtual venue can include venue information such as a shape, a background, colors, seats, layout, and other details for the venue at which the event occurs. In some embodiments, the virtual venue for an event can be known and accessed for the event. In other embodiments, the event can require the creation of a new virtual venue. In some embodiments, a group of viewers can select to view the event as though within their own private event in a virtual venue that does not show viewers outside of the group.

Figure 5:
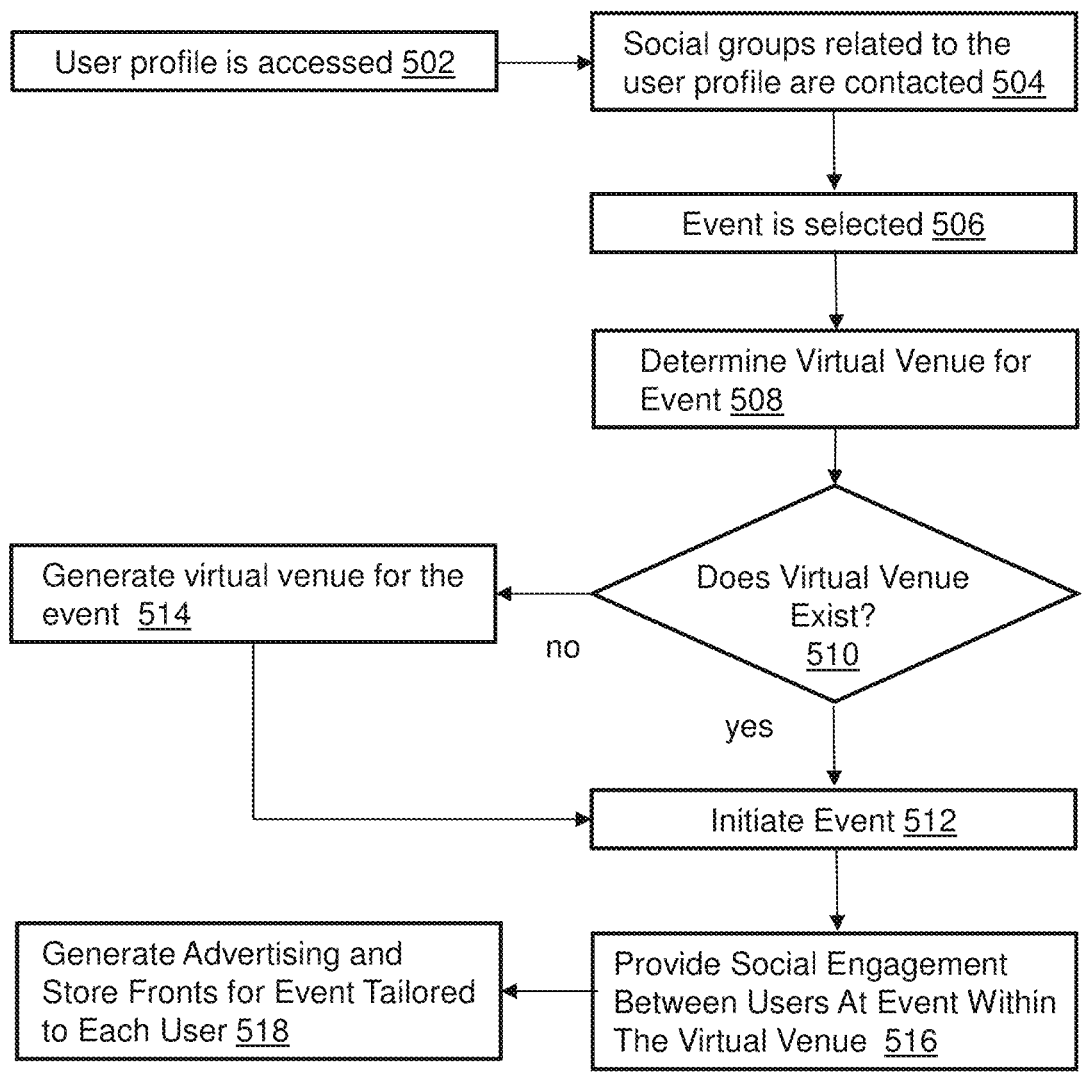
FIG. 5 depicts an illustrative embodiment of a method used in portions of the systems described in FIG. 1-4.

FIG. 5 depicts an illustrative embodiment of a method 500 used by the systems in FIGS. 1-4. Method 500 exemplarily begins where a user profile is accessed in Step 502. By accessing the user profile, the user can generate details about avatars related to the user profile, maintain contacts with other users, provide details about user preferences, and provide information about billing and other payment services for the user account.

In Step 504, a user can engage with other users in a social network. Contact information can be stored and engaged to create and maintain contacts with other users. In some embodiments, virtual events can be organized with the other users so that groups of friends or families, and even strangers with similar interests can extend invitations to events with each other. Exemplarily, the planning of events can include determining a time for the event, a venue for the event, seating or other views provided in the event, as well as providing links to other related events, groups, or individuals.

Exemplarily, an event is selected in Step 506. The selection of the event can take place simultaneously with Step 504 or after a group is formed or before a group is formed. The event can be any event from a live sporting event or other live events. The event can be a recreation of a previous event, such as a famous sporting event or concert from the past. The event can include rallies, parades, circuses, momentous occasions such as live space exploration and other occasions. Exemplarily, these events will be broadcast and have appropriate equipment provided so as to record and broadcast the event in virtual reality to each of the viewers of the event.

Exemplarily, in Step 508, a virtual venue for the event is selected. In some examples, the virtual venue can be model of an existing venue in which an event takes place. The virtual venue can include sporting arenas, concert halls, convention centers, street-side views, and other spaces. In some embodiments, the virtual venue may not exist. The virtual venue may not be in a library of virtual venues available to the system or the users may prefer to create a custom virtual venue. Accordingly, in Step 510, it is determined whether there already is an existing virtual venue.

In Step 514, if there is no ready virtual venue, then a new virtual venue for the group and the event can be created. In some embodiments, the virtual venue can created from existing archival photos and videos of a particular location at which the event will take place. In other embodiments, a custom virtual venue can be generated according to customer specifications. In other events, a virtual venue can be generated through software such a venue builder. In some embodiments, the virtual venue can be generated as discussed below in FIG. 6 with respect to method 600.

In Step 512, the event can be initiated for the virtual venue. The initiation can be at the start of the event itself, prior to the event, or after the start of the event. For example, a viewer or group of viewers may, at the last minute, decide to join an event in progress. In other examples, a viewer or viewer may choose to start an event early before the actual event activity takes place so as to peruse the virtual venue itself or to engage in social activities with other participants in the event in the virtual venue.

During the event and the use of the virtual venue, the viewers can engage in social interactions with each other as illustrated in Step 516. Exemplarily, these social interactions can include exchanges between avatars of the viewers in the virtual venue. For example, two avatars can communicate with each other verbally, wherein the system provides their acoustic words to each other or the avatars can exchange text messages with each other. In some instances, the avatars themselves can have facial expressions that reflect the actual facial expression of each user during the interaction or based on a selection of preprogrammed facial expressions for each avatar.

Exemplarily, each viewer's or user's avatar can be customized by that user. The avatar can wear virtual clothing chosen by the user or selected by default. The avatars can have expressions and movements preprogrammed, such as laughing out loud, high-fives, and jumping for joy, among other possible actions. Exemplarily, these actions can be viewed publicly by other avatars within the virtual reality space of the virtual venue or by watching a video representation of the virtual venue and event outside of the virtual venue (i.e., such as user watching the event on a conventional computer display).

Exemplarily, in Step 518, advertising and virtual stores can be provided for the virtual venue as discussed below. In some embodiments, advertising can be provided in peripheral portions of a viewer's field of view. In some embodiments, the viewers can come across virtual store fronts as they traverse across the virtual venue.

Exemplarily, the virtual venue is a traversable, three-dimensional area. Exemplarily, the viewers can view all portions of the virtual venue by utilizing a virtual reality headset or goggles so as to see the event taking place or to engage with the icons or avatars of other viewers. Exemplarily, the viewers can travel to various portions of the virtual venue. In some examples, areas of the virtual venue may require additional tickets or fees to access. In some examples, there may be VIP lounges or group lounges that are only accessible by membership in certain groups or by possessing certain membership privileges. Exemplarily, the viewers can travel to different portions of the virtual venue so as to view the event, be it a concert, football game, or poker tournament, at different perspectives.

Exemplarily, in some embodiments, the viewers may be able to leave a real time presentation of an event or a pre-recorded presentation of the event to enter into a trick play mode. For example, one or more viewers may decide to rewind a portion of the event. The viewers may choose to further zoom in or out of the event. The viewers may wish to pause the event or to fast-forward through certain portions of the event. Viewers may even wish to restart or end the event. Exemplarily, the viewers can return to a real-time portion of the event so as to view what the rest of the viewership would consider real-time.

Figure 6:
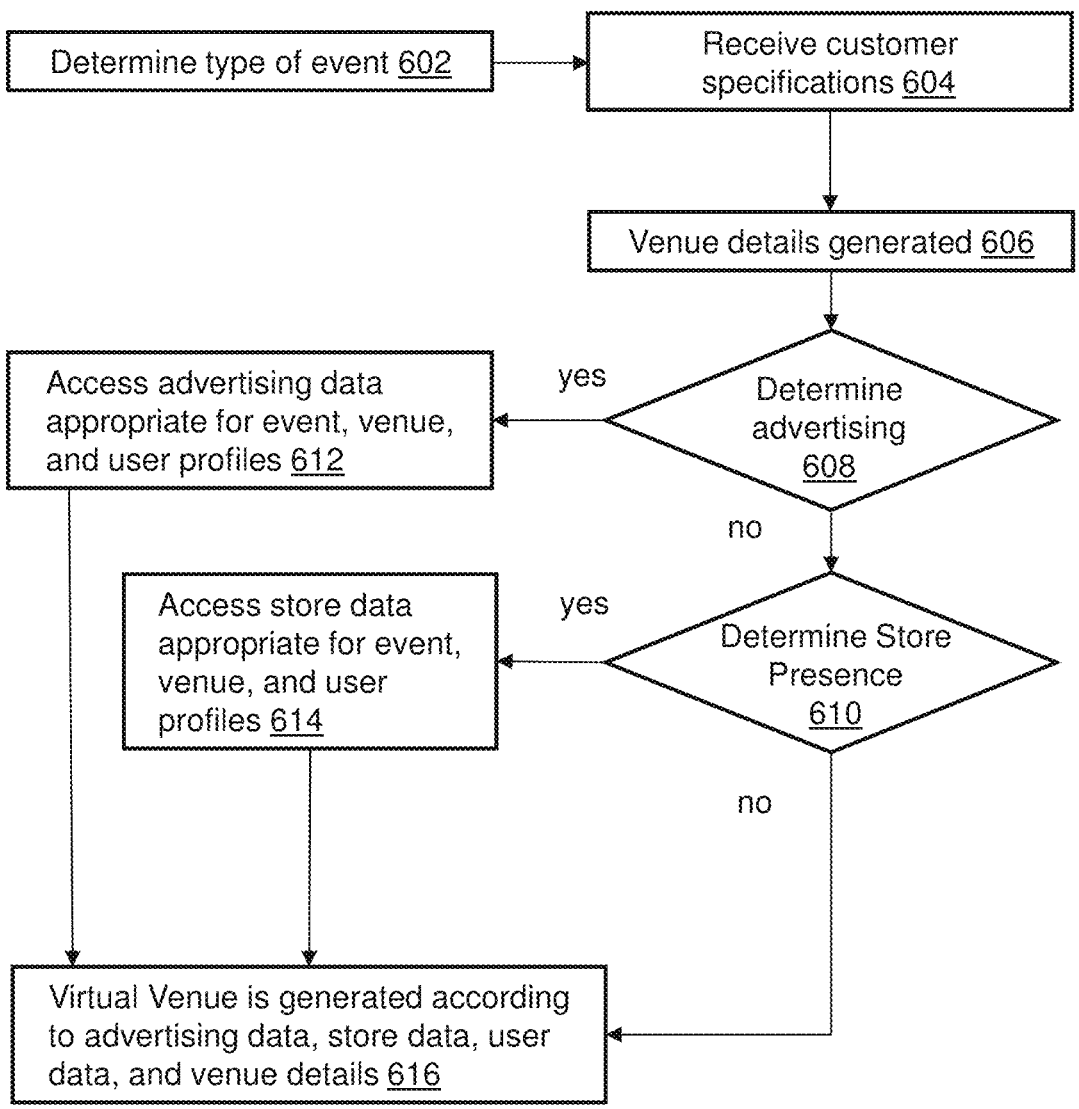
FIG. 6 depicts an illustrative embodiment of a method used in portions of the systems described in FIG. 1-4.

FIG. 6 depicts an illustrative embodiment of method 600 used by the systems of FIGS. 1-4. Method 600 exemplarily provides steps for creating a customized virtual venue for users and an event. In Step 602, the type of event is analyzed to determine an appropriate virtual venue space for the event. In Step 604, customer specifications for the virtual venue can be received. In Step 606, details that will define the virtual venue are generated. In Step 606, photos and videos of the venue can be analyzed to generate a virtual venue. The virtual venue can include the event space itself, such as the sporting field or concert stage, as well as additional areas for the viewers to explore, such as trivia information booth, related games, links to other related events, and other options that may be generated for the event.

Next, advertising and storefronts can be generated for the virtual venue. In Step 608, it is determined if advertising will be present at the virtual venue. In some embodiments, the users may decide to forego advertising and pay an additional fee to have an event take place in the virtual venue with no advertising. Advertising may take place as peripheral ads shown in a side view of the user's virtual reality viewing sight line. Advertising may also take place as images appearing within the line of sight of a user in the virtual venue, such as on walls or floors or other parts of the virtual venue.

In Step 612, the advertising data can be gathered for the event and the virtual venue. Exemplarily, the advertising can be tailored for each viewer of the event at the virtual venue. In one example, each user profile can be examined to determine advertising best suited for that viewer. The advertising can be selected based on a user's purchase history, a viewing history, a venue selection history, demographic information, and other relevant data collected about the user.

In Step 614, a store can be generated for the virtual venue. Exemplarily, the virtual venue can include a virtual store at which viewers of the event at the virtual venue can travel to within the virtual venue. In other embodiments, the viewers can simply select a menu icon to be taken the virtual store. Exemplarily, the virtual store will be generated based on the user profile of the person viewing the virtual store, the venue, and the event. In one example, a group of viewers of a concert in a virtual venue that is a stadium can each have a personalized virtual store. In their personalized virtual store, items can be preselected based on the user's preferences as well as based on predictive modeling of what the user may prefer. For example, only apparel with a matching size can be presented. In the virtual store, the user's profile can be accessed for quick ordering, payment, and delivery options.

In Step 616, the virtual venue can be generated based on the above chosen venue details, venue virtual store, and venue virtual advertising decided in the above steps. Accordingly, viewers of the event in the virtual venue will be provided with a three-dimensional virtual space in which their avatars can travel and explore. Additionally, the viewers can move to different viewpoints and locations to engage in social interactions with the avatars of other users, visit the virtual store, view the virtual advertising, and to see additional exhibits within the virtual venue.

While for purposes of simplicity of explanation, the respective processes are shown and described as a series of blocks in FIGS. 5-6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
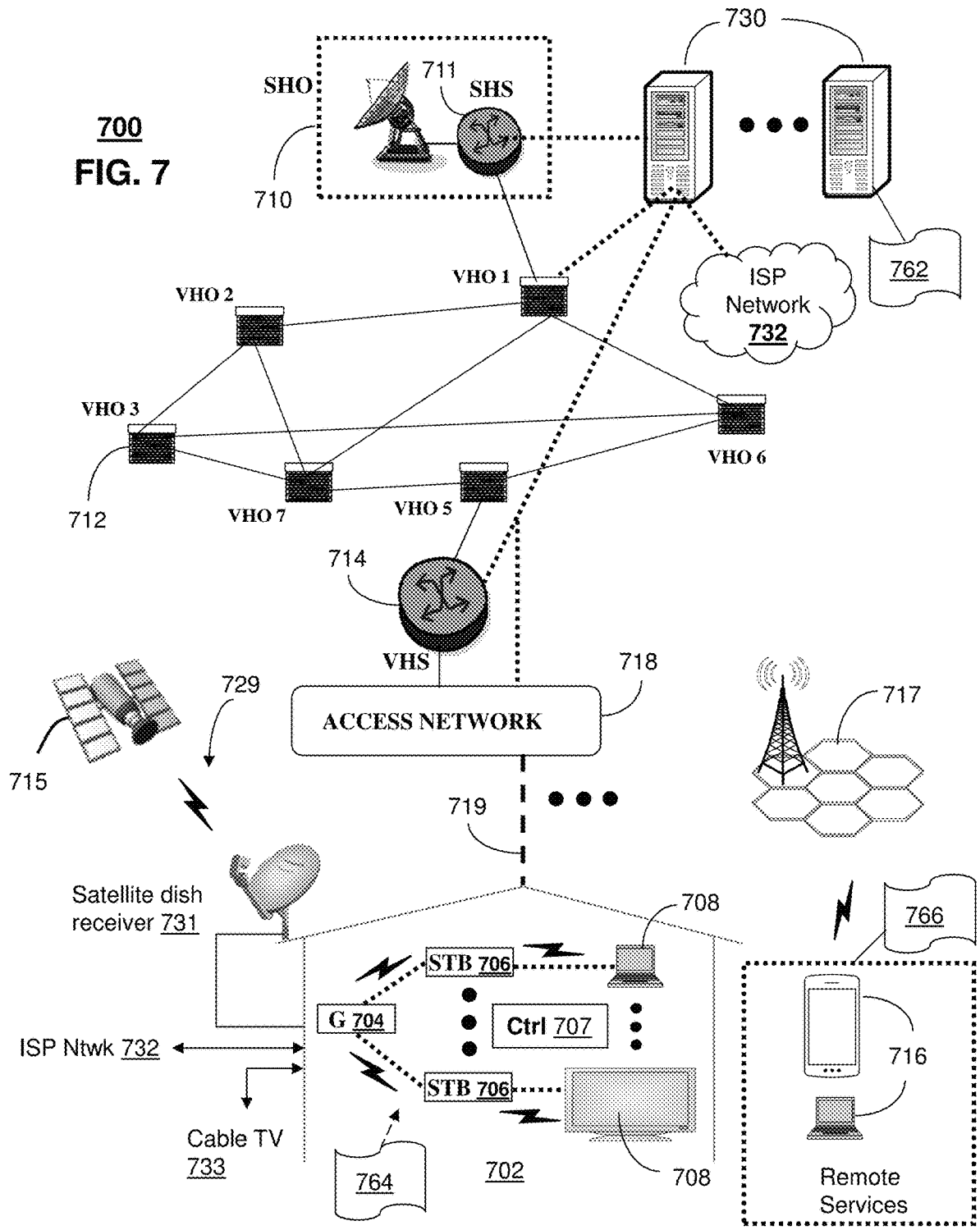
FIG. 7 depicts an illustrative embodiment of a communication systems that provide media services to the systems of FIGS. 1-4.

FIG. 7 depicts an illustrative embodiment of a communication system 700 for providing various communication services, such as delivering media content. The communication system 700 can represent an interactive media network, such as an interactive television system (e.g., an Internet Protocol Television (IPTV) media system). Communication system 700 can be overlaid or operably coupled with virtual reality systems 100, 200, 300, and 400 of FIGS. 1-4 as another representative embodiment of communication system 700. For instance, one or more devices illustrated in the communication system 700 of FIG. 7 can perform a method that includes accessing a profile for each participant of a plurality of participants for a virtual reality space to participate in an event, generating a virtual venue for the virtual reality space, wherein the generating the virtual venue including replicating an architecture of a venue associated with the event and generating a plurality of virtual stores for the virtual venue, wherein each virtual store of the plurality of virtual stores is associated with each participant of the plurality of participants according to each profile for each participant of the plurality of participants, accessing a plurality of cameras and a plurality of microphones associated with the event, generating the virtual reality space for the event based on the plurality of participants, the virtual venue, the plurality of microphones, and the plurality of cameras, generating a plurality of avatars for each participant of the plurality of participants according to each profile for each participant of the plurality of participants to participate in the event, and presenting the virtual reality space to user equipment in a virtual reality format.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (Wi-Fi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/ or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a virtual reality server (herein referred to as virtual reality server 730). The virtual reality server 730 can use computing and communication technology to perform function virtual reality services, which can include among other things, the methods 500 and 600 of FIGS. 5 and 6. For instance, function 762 of server 730 can be similar to the functions of the virtual reality immersive product generator 408, test and development center 410, multimedia sub-system (MMSS) 412, and venue creator 414 of FIG. 4 along with methods 500 and 600 of FIGS. 5 and 6. The media processors 706 and wireless communication devices 716 can be provisioned with software functions 764 and 766, respectively, to utilize the services of virtual reality server 730. For instance, functions 764 and 766 of media processors 706 and wireless communication devices 716 can be similar to the functions described for the virtual reality goggle system 404 of FIG. 4. In addition function 764 can present the event via the display 708 in a traditional format or in a modified virtual mode through the display 708.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
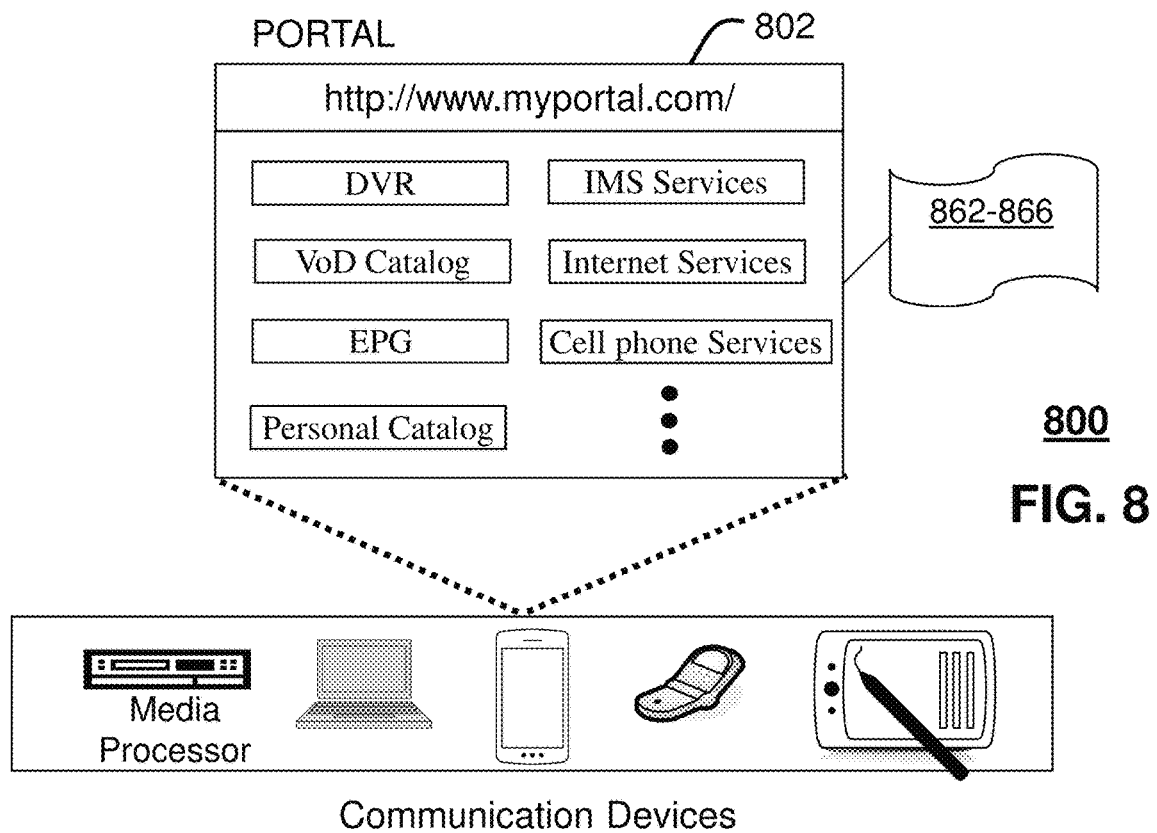
FIG. 8 depicts an illustrative embodiment of a web portal for interacting with the communication systems of the systems of FIGS. 1-4 and methods of FIGS. 5 and 6.

FIG. 8 depicts an illustrative embodiment of a web portal 802 of a communication system 800. Communication system 800 can be overlaid or operably coupled with virtual reality systems 100, 200, 300, and 400 of FIGS. 1-4 and communication system 700 as another representative embodiment of virtual reality systems 100, 200, 300, and 400 of FIGS. 1-4 and communication system 700. The web portal 802 can be used for managing services of virtual reality systems 100, 200, 300, and 400 of FIGS. 1-4 and communication system 700. A web page of the web portal 802 can be accessed by a Uniform Resource Locator (URL) with an Internet browser using an Internet-capable communication device such as those described in virtual reality systems 100, 200, 300, and 400 of FIGS. 1-4 and FIGS. 5-6. The web portal 802 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 802 can also be used for provisioning IMS services described earlier, provisioning Internet services, provisioning cellular phone services, and so on.

The web portal 802 can further be utilized to manage and provision software applications 764 and 766 to adapt these applications as may be desired by subscribers and/or service providers of virtual reality systems 100, 200, 300, and 400 of FIGS. 1-4 virtual reality systems 100, 200, 300, and 400 of FIGS. 1-4 and communication system 700. For instance, the various participants in an exemplary event provided in a virtual venue can log into their on-line accounts and provision the virtual reality immersive product generator 408 or virtual reality server 730 with their profile information so as to customize their avatars and to set up groups of participants that can view the event in the virtual venue, as well as to provide payment information to utilize these service and to pay for products purchased in the virtual store, and so on. Service providers can log onto an administrator account to provision, monitor and/or maintain the virtual reality systems 100, 200, 300, and 400 of FIGS. 1-4 or virtual reality server 730.

Figure 9:
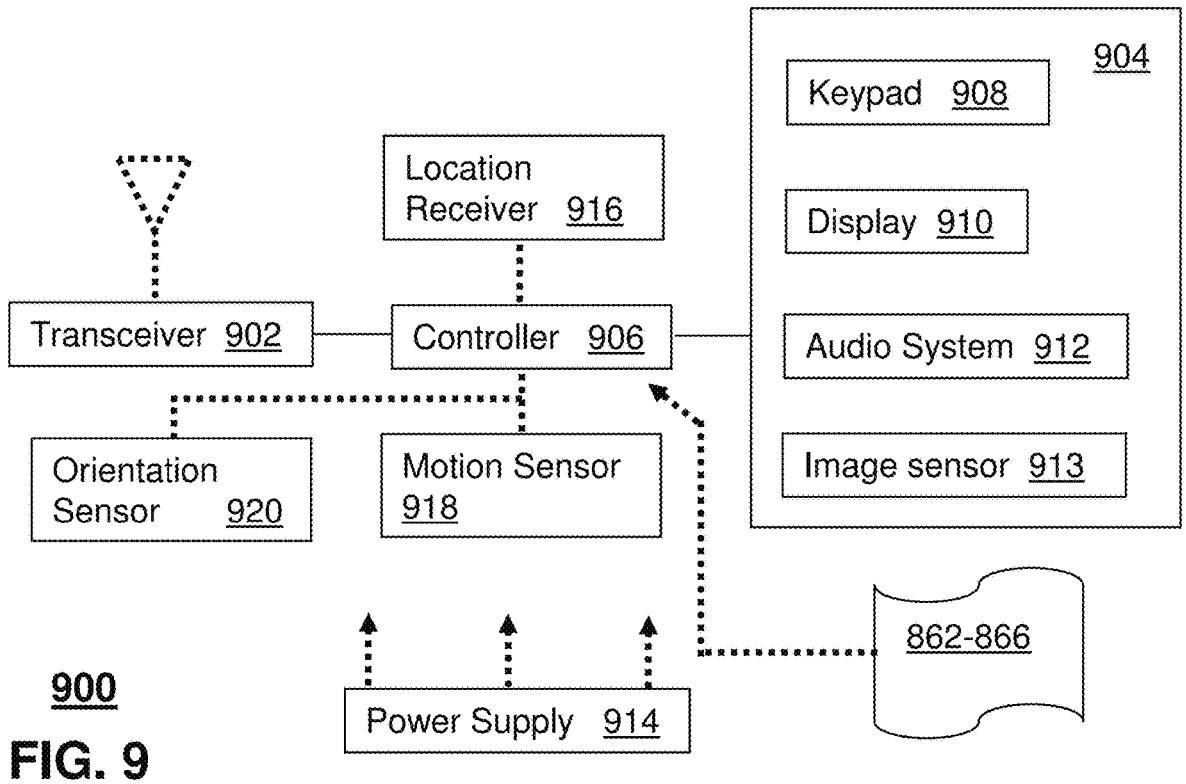
FIG. 9 depicts an illustrative embodiment of a communication device.

FIG. 9 depicts an illustrative embodiment of a communication device 900. Communication device 900 can serve in whole or in part as an illustrative embodiment of the devices depicted in virtual reality systems 100, 200, 300, and 400 of FIGS. 1-4 and communication system 700 and can be configured to perform portions of methods 500 and 600 of FIGS. 5 and 6 so as to perform virtual reality presentations for a user of the communication device 900. Exemplarily, communication device 900 can provide the user with the virtual reality experience locally by processing the information from virtual reality server 730.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera, or other image devices, for capturing still or moving images. Exemplarily, the images captured by the communication device 900 can track the user's eyeballs in one embodiment as well as the motion of the user's head in other exemplary embodiments to thus inform the virtual reality process. In some embodiments, the movement of limbs of the person wearing or using the communication device 900 can be observed by the image sensor 913 to track the limb to determine which virtual menu option is being selected.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics). Thus, by using the motion sensor 918 and the orientation sensor, the user can exemplarily utilize the communication device 900 to engage in a virtual reality experience in the virtual venue where, when attached to the user's face, the viewpoint of the user changes in accordance with the motion of the user's head and/or eyeballs.

The communication device 900 can use the transceiver 902 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of virtual reality systems 100, 200, 300, and 400 of FIGS. 1-4, the media processor 706, the media devices 708, or the portable communication devices 716 of FIG. 7. It will be appreciated that the communication device 900 can also represent other devices that can operate in virtual reality systems 100, 200, 300, and 400 of FIGS. 1-4, the communication systems 700 of FIG. 7 such as a gaming console and a media player. In addition, the controller 906 can be adapted in various embodiments to perform the functions 764 and 766, respectively.

Upon reviewing the aforementioned embodiments, it would be evident to an artisan with ordinary skill in the art that said embodiments can be modified, reduced, or enhanced without departing from the scope of the claims described below. For example, the events and the virtual venues created for these events can be created on the fly, such as to create virtual news events in which users can experience breaking news as it happens. In other examples, users can utilize the virtual venues for events such as business meetings and educational lectures. In other embodiments, gaming programming can be utilized to present virtual reality adventures to the users and to the groups of users the user associates with in the virtual venue. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
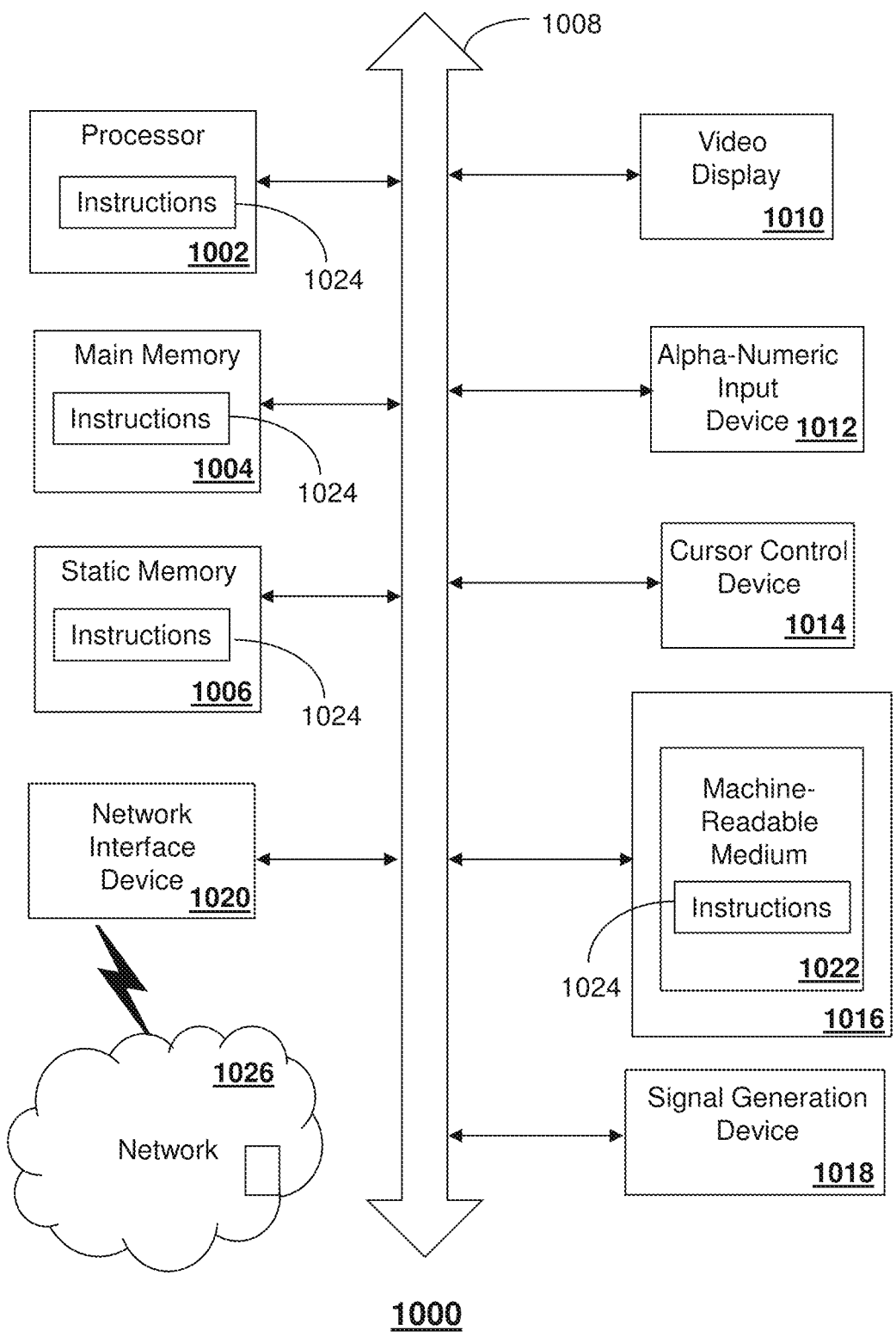
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the virtual reality server 730, the media processor 706, the virtual reality goggle system 404, venue creator 414, the multimedia sub-system (MMSS) 412, and other elements of virtual reality systems 100, 200, 300, and 400 of FIGS. 1-4. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   receiving, from a virtual reality server, details for a virtual event to be presented in a virtual reality space, wherein the virtual event corresponds to a live event, wherein the receiving details includes receiving social information about a group of related participants of a plurality of participants of the virtual event, the group of related participants participating together virtually as a group in the virtual event;

generating a virtual venue for the virtual reality space according to a real venue where the live event occurs;

generating the virtual reality space for the virtual event based on the plurality of participants, and the virtual venue;

generating a plurality of images for each participant of the group of related participants according to a profile for each participant of the group of related participants to participate in the virtual event;

adjusting the virtual reality space for the virtual event by removing images of an audience captured in the plurality of images so that the audience is not depicted in the virtual reality space and by adding avatars that are each representative of one of the group of related participants;

adjusting the virtual reality space for the virtual event by presenting to the group of related participants audio of the live event without crowd noise or other background noises from the live event;

generating a plurality of virtual store fronts for the virtual reality space wherein the generating the plurality of virtual store fronts comprises generating each respective virtual store front based on a respective profile for a respective participant of the group of related participants, respective virtual store fronts of the plurality of virtual store fronts offering for sale both virtual items wearable by an avatar representative of a respective participant of the group of related participants and real world items wearable by respective participants of the group of related participants; and presenting the virtual reality space without depicting the audience to user equipment in a virtual reality format.

2. The device of claim 1, wherein the receiving details for the virtual event includes receiving advertising information for the virtual event, and wherein the operations further comprise:

presenting advertising in the virtual reality space associated with a profile for a user of the device; and generating a menu to be observed by the user of the device in the virtual reality space, including presenting a menu option to the user of the device to access a particular virtual store front associated with the user of the device.

3. The device of claim 2, wherein the generating a menu to be observed in the virtual reality space comprises placing the menu in a central point of view of the virtual reality space, and wherein an upper portion of the central point of view of the virtual reality space includes a trigger to access the menu.

4. The device of claim 2, wherein a central point of view for the user equipment includes the virtual event, and wherein the generating a menu to be observed in the virtual reality space comprises generating a trigger to access the menu in an upper portion of the central point of view.

5. The device of claim 1, wherein the operations further comprise generating a group audio feed between the group of related participants of the plurality of participants to allow the group of related participants to hear the group audio feed.

6. The device of claim 1, wherein the operations further comprise:

providing each respective virtual store front to the user equipment, wherein each virtual store of the plurality of virtual store fronts sells virtual items to be utilized in the virtual reality space and real world items to be delivered to at least one of the group of related participants.

7. The device of claim 1, wherein the operations further comprise:

accessing a plurality of cameras and a plurality of microphones associated with the live event to be presented in a virtual reality space; and generating a virtual venue for the virtual reality space based on an audio input from the plurality of microphones and a video input from the plurality of cameras.

8. A non-transitory machine-readable storage medium, comprising executable instructions that, when executed by a processing system including a processor, facilitate performance of operations, comprising:

accessing a plurality of cameras and a plurality of microphones associated with a live event to be presented in a virtual reality space;

generating a virtual reality space for a virtual event based on event data for the live event including an audio input from the plurality of microphones and a video input from the plurality of cameras;

receiving profiles for each participant of a group of related participants of a plurality of participants;

generating a plurality of images for each participant of the group of related participants according to each profile for each participant of the plurality of participants to participate in the virtual event in the virtual reality space, wherein equipment of each participant presents the virtual reality space in a virtual reality format;

receiving activity information for each participant of the group of related participants including a participant field of view and participant social information;

manipulating the plurality of images in the virtual reality space according to the activity information;

adjusting the virtual reality space for the virtual event by removing from the virtual reality space, images of an audience captured in the images so that the audience is not depicted in the virtual reality space and by adding avatars that are each representative of one of the group of related participants;

adjusting the virtual reality space for the virtual event by presenting to the group of related participants an audio stream of the live event, the audio stream of the live event based on the audio input and omitting crowd noise or other background noises at the live event; and generating a plurality of virtual stores for the virtual event, wherein each respective virtual store of the plurality of virtual stores is associated with a respective participant of the group of related participants and the virtual event and according to each respective profile for each respective participant of the group of related participants, wherein the generating the plurality of virtual stores further comprises preselecting items for each respective virtual store based on respective preferences of each respective participant of the group of related participants, the items including virtual clothing to be worn in the virtual event by respective avatars that are representative of each respective participant of the group of related participants and real world clothing wearable by respective participants of the group of related participants.

9. The non-transitory machine-readable storage medium of claim 8, wherein the operations further comprise:

adding a plurality of avatars to the virtual reality space, each respective avatar of the plurality of avatars being representative of a respective participant of the group of related participants.

10. The non-transitory machine-readable storage medium of claim 8, wherein the generating the plurality of virtual stores comprises:
preselecting items for each respective virtual store based on respective preferences of each respective participant of the group of related participants, the items including clothing to be worn in the virtual event by respective avatars that are representative of each respective participant of the group of related participants; and
displaying the items in each respective virtual store.

11. The non-transitory machine-readable storage medium of claim 8, wherein the operations further comprise:
receiving advertising information for the virtual event, wherein the advertising information is provided to the equipment of each participant of the group of related participants; and
offering for sale, in each virtual store of the plurality of virtual stores, virtual items to be utilized in the virtual reality space and real world items to be delivered to at least one of the plurality of participants, and wherein each respective virtual store of the plurality of virtual stores is respectively provided to the equipment of each participant.

12. The non-transitory machine-readable storage medium of claim 8, wherein the operations further comprise:
generating a group audio feed between the group of related participants of the plurality of participants to allow the group of related participants to hear the group audio feed, wherein the plurality of microphones comprise noise cancelling microphones that filter out noise external to the virtual event, and
providing the group audio feed and audio from the noise cancelling microphones without the noise external to the virtual event to the equipment of each participant of the group of related participants.

13. The non-transitory machine-readable storage medium of claim 12, wherein the operations further comprise:
generating a virtual venue according to a real venue in which the live event takes place; and
presenting to the equipment of each participant of the group of related participants the virtual event within the virtual venue.

14. The non-transitory machine-readable storage medium of claim 13, wherein the generating the virtual venue comprises determining subscription based zones in the virtual venue to limit access to different participants based on a subscription level of each participant of the plurality of participants.

15. A method, comprising:
accessing, by a processing system comprising a processor, a respective profile for each respective participant of a group of related participants of a plurality of participants for configuring a virtual reality space to participate in a virtual event that corresponds to a real event having an audience;
generating, by the processing system, a virtual venue for the virtual reality space, wherein the generating the virtual venue comprises:
generating a plurality of virtual stores for the virtual venue, wherein each respective virtual store of the plurality of virtual stores is associated with each respective participant;
generating each respective virtual store according to each respective profile for each respective participant, the virtual venue and the virtual event; and
preselecting items for each respective virtual store according to respective preferences of each respective participant of the group of related participants, the items including clothing to be worn in the virtual venue by respective avatars that are representative of each respective participant of the group of related participants, the items including real world items wearable by respective participants of the group of related participants;
accessing, by the processing system, a plurality of cameras and a plurality of microphones associated with the real event;
generating a plurality of images for each participant of the group of related participants according to each profile for each participant of the group of related participants to participate in the virtual event;
generating, by the processing system, the virtual reality space for the virtual event based on the plurality of participants;
generating, by the processing system, an adjusted virtual reality space for the virtual event by substituting avatars that are each representative of one of the group of related participants for the audience captured in the images so that the audience is not depicted in the virtual reality space, and presenting, in the adjusted virtual reality space, to the group of related participants, presented audio of the real event from the plurality of microphones associated with the real event, the presented audio of the real event omitting crowd noise or other background noises from the real event; and
presenting the adjusted virtual reality space depicting the avatars and not depicting the audience to user equipment in a virtual reality format.

16. The method of claim 15, further comprising generating advertising data for the virtual event according to each respective profile for each respective participant.

17. The method of claim 16, further comprising positioning advertisements corresponding to the advertising data on virtual walls within the virtual venue.

18. The method of claim 15, further comprising:
generating a menu to be observed by the user equipment;
presenting the virtual event in a central point of view of the user equipment, including presenting a trigger to access the menu in an upper portion of the central point of view; and
presenting a menu option to a user of the user equipment to access a particular virtual store associated with the user of the user equipment.

19. The method of claim 15, further comprising generating a group audio feed between the group of related participants to allow the group of related participants to hear the group audio feed.

20. The method of claim 19, wherein the plurality of microphones comprises noise cancelling microphones that filter out noise external to the real event, and wherein the method further comprises:
providing to the group of related participants the group audio feed and audio from the noise cancelling microphones without the noise external to the virtual event.

* * * * *